United States Patent [19]

Turner

[11] Patent Number: 5,040,810
[45] Date of Patent: Aug. 20, 1991

[54] BALE SAVER CONTAINER

[76] Inventor: Thomas V. Turner, 1067 County Rd. 218, Cheyenne, Wyo. 82009

[21] Appl. No.: 511,774

[22] Filed: Apr. 20, 1990

[51] Int. Cl.⁵ ............................................. B62B 1/00
[52] U.S. Cl. .................................. 280/47.26; 248/129; 280/79.2
[58] Field of Search ............... 280/47.26, 47.17, 47.34, 280/79.2; 206/83.5, 524.1; 414/796.5, 923, 412, 24.5, 795.4, 786; 248/98, 129; 221/197, 155; 271/145; 220/676; 211/50; 119/58-61, 51.03; 53/390, 492, 381 R

[56] References Cited

U.S. PATENT DOCUMENTS

| | | | |
|---|---|---|---|
| D. 79,214 | 8/1929 | Sebastian | 211/50 |
| 530,030 | 11/1894 | Fitzpatrick | 280/79.2 |
| 2,778,654 | 1/1957 | Gottlieb | 280/47.26 |
| 2,992,873 | 7/1961 | Luscher | 280/79.2 |
| 3,279,811 | 10/1966 | Mitty et al. | 280/47.26 |
| 3,777,439 | 12/1973 | Fried | 53/492 |
| 3,903,789 | 9/1975 | Hurley | 211/50 |
| 4,600,113 | 7/1986 | Demars | 280/47.26 |

Primary Examiner—Andres Kashnikow
Assistant Examiner—Eric Culbreth
Attorney, Agent, or Firm—Dean P. Edmundson

[57] ABSTRACT

A bale saver container is described for confining and supporting a bale of fibrous material in an upright position. The container confines the material (e.g., hay or straw) after the strings of the bale have been severed so as to prevent loose material from being scattered and wasted.

2 Claims, 2 Drawing Sheets

BALE SAVER CONTAINER

FIELD OF THE INVENTION

This invention relates to containers for fibrous materials such as straw and hay. More particularly, this invention relates to techniques for confining bales of fibrous materials to prevent waste.

BACKGROUND OF THE INVENTION

Fibrous materials such as straw and hay are normally compressed and baled in the field and stored in stacks until they are needed. Then the bales are typically opened one at a time by cutting the twines (either string or wire) to access the straw or hay.

Unfortunately, once a bale is opened, the entire contents of the bale are loose. Consequently, unused portions of the bale are not confined and can become easily separated or scattered. This is not only untidy but it also leads to waste of some of the loose material. Much time can be spent attempting to sweep or rake loose material from the floor area.

There has not heretofore been provided a convenient means for confining baled material after a bale has been opened.

SUMMARY OF THE PRESENT INVENTION

In accordance with the present invention there is provided a bale saver container for confining and supporting a bale of fibrous material in an upright manner. The container includes a floor member and four upright wall members. Each wall is attached at its bottom edge to the floor member. The front wall includes a slotted aperture extending vertically downward from the top edge to a point in close proximity to the floor member. The container includes handle means for carrying or moving the container.

A bale of fibrous material such as hay or straw can be slidably received in the open end of the container. For example, the container can be laid on one side (e.g., the front), after which the bale can be slid into the container. Then the container can be tipped up and rested on its bottom. After the strings on the bale have been severed, the fibrous material can be accessed and any desired amount can be removed from the open top of the container.

The contents of the container are confined and supported by the walls of the container to prevent the fibrous material from being scattered over a wide area. The presence of the slotted aperture allows a person to easily reach and access the fibrous material regardless of the depth of such material in the container.

Optionally, there may be wheels attached to the lower portion of the container so that it can be wheeled from one location to another.

Other advantages of the bale saver container of the invention will become apparent from the following detailed description.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
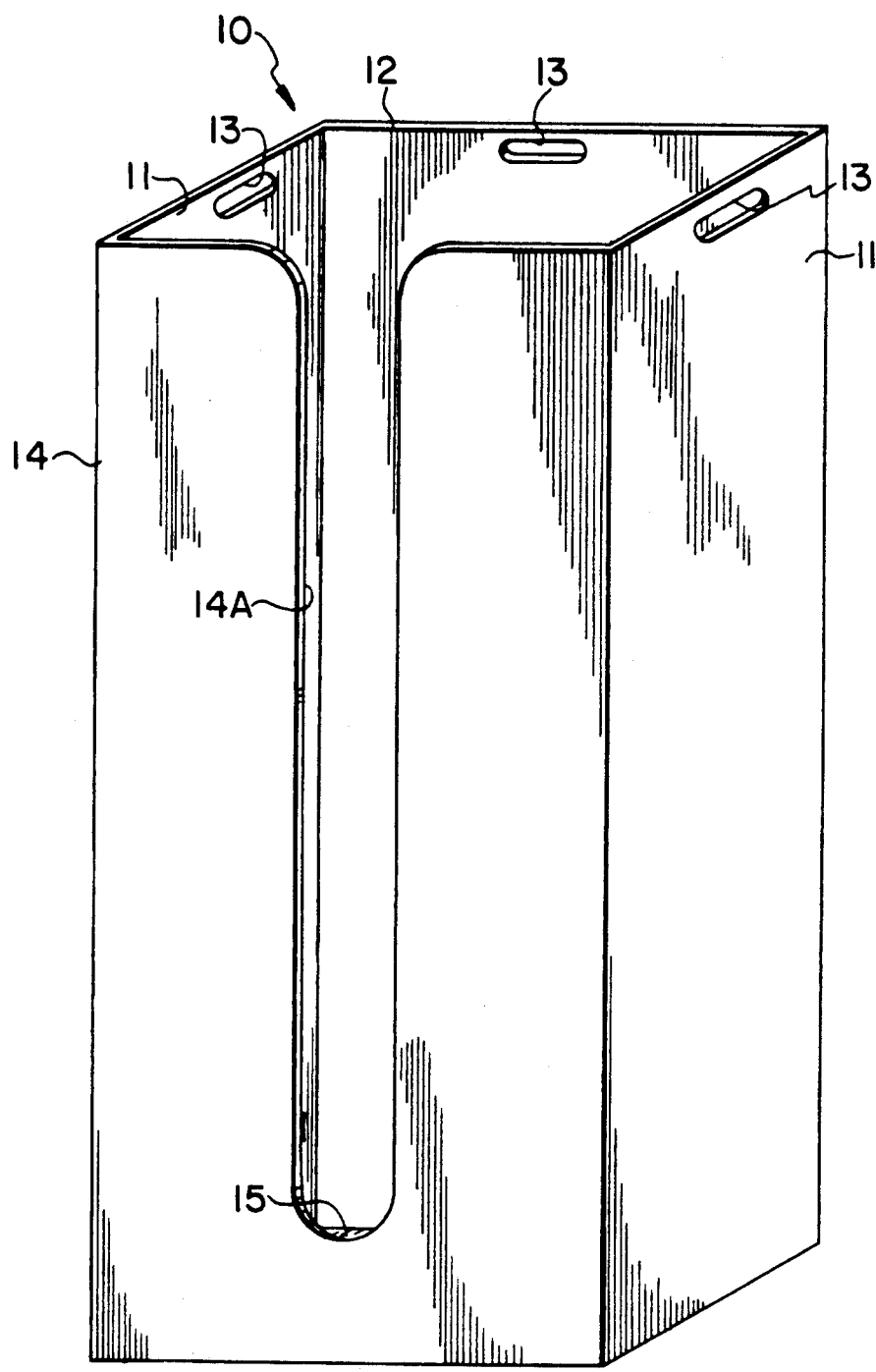
FIG. 1 is a perspective view of one embodiment of bale saver container of the invention.
Figure 2:
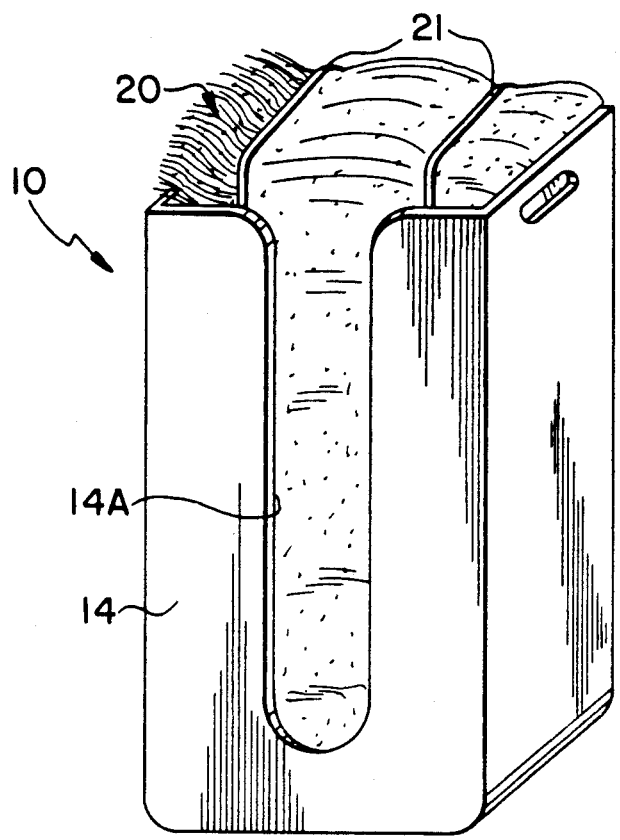
FIG. 2 is a perspective view of the container of FIG. 1 with a bale of fibrous material therein.

In FIGS. 1 and 2 there is illustrated one embodiment of bale saver container 10 of the invention comprising upright side walls 11, rear wall 12, and front wall 14. The bottom edge of each wall member is attached to a floor member 15.

The front wall 14 includes an elongated slotted aperture 14A extending from the top edge of the front wall to a point in close proximity to the floor of the container. The width of the slotted aperture is at least about 3 to 6 inches to allow a person's hand(s) to reach through it to grasp and lift fibrous material out of the container as needed.

The height of the container is preferably about 36 to 40 inches (i.e., nearly the length of an ordinary bale 20 of fibrous material such as hay or straw). The cross-section of the container is preferably rectangular and just slightly larger than the size of the bale. For example, the side walls may have a width of about 18 inches, and the front and rear walls have a width of about 21 inches.

One or more openings 13 may be provided in the rear wall and the side walls to function as handles for carrying or moving the container. Of course, other handles could be attached to the upper end of the container, if desired. Wheels may also be rotatably supported on the lower portion of the container, if desired, to facilitate moving the container from one location to another.

To insert a bale 20 into the open end of the container, it is preferred to lay the container on its front side and then slide the bale into the container. FIG. 2 shows such a bale in the container after the container has been raised back to its upright position. Then the strings 21 (either plastic twine or wire) can be severed. This allows any desired amount of fibrous material to be easily removed from the container for use.

Figure 3:
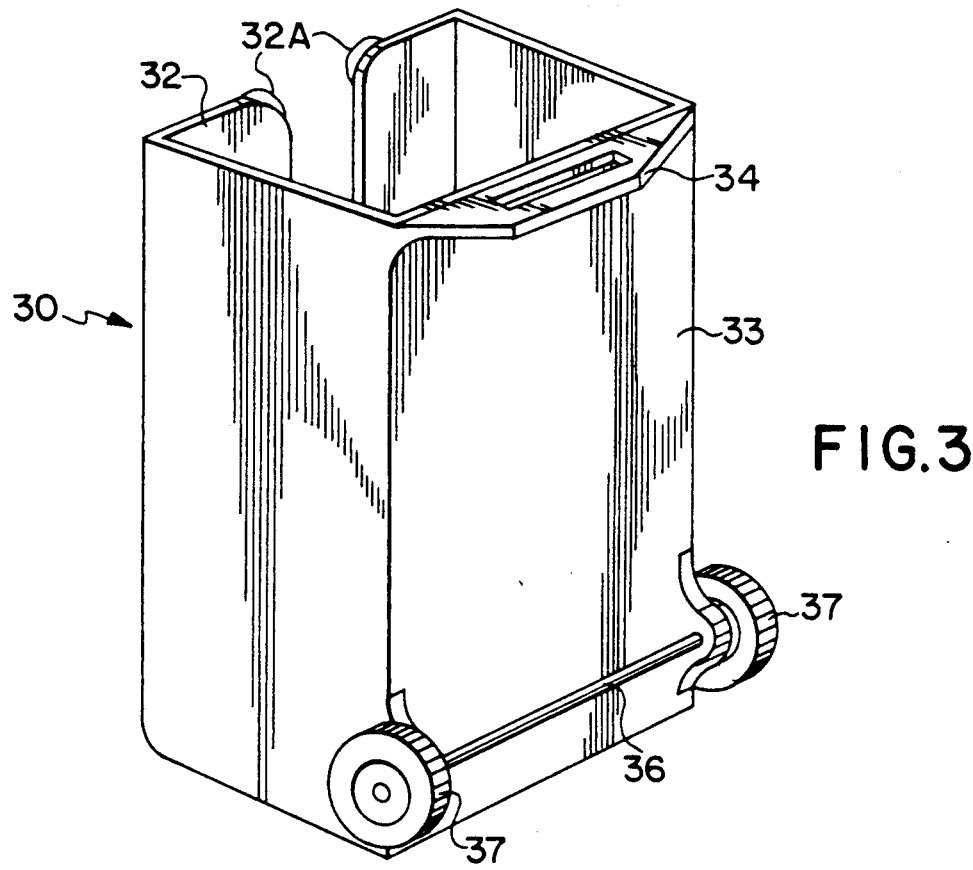
FIG. 3 is a perspective view of another embodiment of bale saver container of the invention.

FIG. 3 illustrates another embodiment 30 of bale saver container for the invention. In the embodiment the front wall 32 includes forwardly projecting ear members 32A at the upper edge. These ears are intended to engage or grip the ground when the container is laid on its front face. Then when a bale is pushed into the container, the ears resist rearward movement of the container. The ears may project forwardly about 1 to 2 inches, for example.

Handle means 34 at the upper end of the rear wall projects rearwardly to facilitate movement of the container. Wheels 37 are rotatably supported on axle 36 carried by the lower end of the rear wall of the container. The wheels greatly facilitate movement of the container from one location to another. Alternatively, the wheels could be attached under the floor of the container and may be recessed, if desired.

Preferably the side walls are parallel to each other, and the front and rear walls are also parallel to each other.

The container may be composed of any suitable rigid material. Preferably it is composed of plastic (e.g., polyethylene, fiberglass, etc.) although it could be made of metal or wood or composite materials.

Other variants are possible without departing from the scope of the present invention.

What is claimed is:

1. A method for confining and supporting a bale of fibrous material in an upright manner, wherein said bale includes twines securing said fibrous material; said method comprising the steps of:
   (a) providing a bale saver container comprising:
      (i) a rectangular floor member;
      (ii) two spaced-apart, upright, planar, parallel side wall members secured to said floor member;
      (iii) a planar rear wall member secured to said side walls and to said floor member;
      (iv) a front wall member secured to said side walls and to said floor member; wherein said front wall member includes an elongated slotted aperture extending vertically; said aperture including an upper end which is open; and
      (v) handle means on said rear wall member;
   (b) inserting said bale into said container; and
   (c) cutting said twines to release said fibrous material.

2. A method in accordance with claim 1, wherein said front wall member includes forwardly projecting ear members; and wherein said container is rested on said front wall member when said bale is inserted into said container.

* * * * *